United States Patent
Kaminski et al.

(10) Patent No.: US 6,835,058 B2
(45) Date of Patent: Dec. 28, 2004

(54) INJECTION MOLDING MACHINE HAVING A MOVEABLE SCREW WITH A STOP POSITION

(75) Inventors: Axel Kaminski, Wermelskirchen (DE); Klaus Schürmann, Bönen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 240 days.

(21) Appl. No.: 10/161,513

(22) Filed: Jun. 3, 2002

(65) Prior Publication Data

US 2003/0047839 A1 Mar. 13, 2003

(30) Foreign Application Priority Data

Jun. 6, 2001 (DE) .......................................... 101 27 426

(51) Int. Cl.[7] .............................................. B29C 45/80
(52) U.S. Cl. ...................... 425/145; 425/542; 425/549
(58) Field of Search ................................ 425/145, 190, 425/192 R, 549, 542

(56) References Cited

U.S. PATENT DOCUMENTS

| | | | |
|---|---|---|---|
| 3,767,339 A | * | 10/1973 | Hunkar ........................ 425/145 |
| 4,015,916 A | * | 4/1977 | Sokolow ........................ 425/549 |
| 4,133,460 A | * | 1/1979 | Jerpbak ........................ 425/192 R |
| 5,554,326 A | | 9/1996 | Nakazawa et al. .......... 264/40.1 |
| 5,811,136 A | * | 9/1998 | Morita et al. ............... 425/190 |

* cited by examiner

Primary Examiner—Tim Heitbrink
(74) Attorney, Agent, or Firm—Joseph C. Gil; Aron Preis

(57) ABSTRACT

An injection-molding machine is disclosed. The machine has an injection unit and nozzle and the injection unit includes a tubular cylinder and a screw that is capable of back and forth movements along the tubular cylinder. Means are provided to stop the movement of the screw at its end/stop position at a distance from the nozzle so as to form a gap between the screw head and nozzle. The gap has a volume of more than $$\frac{\pi}{4} \cdot D^3$$

and up to the volume of a shot wherein D is the dimension of a single screw stroke. The use of the machine yields molded articles that are virtually streak free.

3 Claims, 1 Drawing Sheet

INJECTION MOLDING MACHINE HAVING A MOVEABLE SCREW WITH A STOP POSITION

FIELD OF THE INVENTION

The invention relates to an thermoplastic molding and more particularly to an injection molding machine

SUMMARY OF THE INVENTION

An injection molding machine is disclosed. The machine has an injection unit and nozzle and the injection unit includes a tubular cylinder and a screw that is capable of back and forth movements along the tubular cylinder. Means are provided to stop the movement of the screw at its end/stop position at a distance from the nozzle so as to form a gap between the screw head and nozzle. The gap has a volume of more than $$\frac{\pi}{4} \cdot D^3$$

and up to the volume of a shot wherein D is the dimension of a single screw stroke. The use of the machine yields molded articles that are virtually streak free.

BACKGROUND OF THE INVENTION

Injection molding machines are known. Patent application DE 195 14 070 A1, disclosed a machine having an injection unit and a casting mold, in which the injection unit comprises a screw movable in the tubular cylinder via guide rods, which screw may likewise be controlled with respect to its start and end/stop position in the tubular cylinder. In addition, controlled vibration in the area of the end/stop position is provided. Nothing is disclosed in this document about the residual volume in the area of the end/stop position.

Small amounts of gases in the plastics melt, which are caused by, for example, air during feeding of the plastics pellets, by chemical or physical reactions during melting or by moist material, may be entrained into the space in front of the screw and cause silvery surface streaks on the molding during injection.

In the middle of the flow channel, the gas bubbles reach the melt front of the plastics. The pressure decreases progressively along the direction of the melt front and the gas bubbles become larger. At the melt front itself, normal pressure prevails initially, and the bubbles burst there and are rolled out and stretched on the cold mold wall. (Depending on the color of the plastics), this leads to silvery, U-shaped streaks open towards the flow direction.

Measures taken to prevent streaks Include predrying of the plastics in accordance with which, prior to processing, the plastics material is dried for several hours at an elevated temperature (80° C.–120° C.) in an additional unit.

Predrying is disadvantageous because additional units are required that increase expenditures on purchase, maintenance and total energy consumption of the injection molding machine. Inadequately dried material causes defects at the molding surface of the above-described type.

Also known is the use of a vented plasticizing unit in which case the gases entrained in the plastics material exit through a vent in the cylinder. The gas bubbles are compressed to a considerable degree in a compression zone, the pressure in the bubbles then amounts to several hundred bar. In the area of the vent, standard atmosphere prevails and the pressure difference leads to bursting of the gas bubbles and the gas escapes through the vent.

Disadvantages of this procedure include difficult process control, possibility of plastics exit through the vent, separate expenditure on a special-purpose plasticizing unit and on additional equipment, together with reduced plasticization performance.

DETAILED DESCRIPTION OF THE INVENTION

The object of the invention is to provide a device and method that avoid the disadvantages of the present design and known methods and minimize streaking.

In accordance with the invention an injection molding machine having an injection unit and a casting mold. The injection unit comprise a tubular cylinder and a screw that is capable of moving in the tubular cylinder in a known manner via guide means, and where the movement of the screw is controlled with respect to its start and end/stop position in the tubular cylinder. In accordance with the invention, the end/stop position of the screw leaves a residual volume of melt, in the tubular cylinder of more than $$\frac{\pi}{4} \cdot D^3$$

and up to at most a melt volume comparable to the shot volume, wherein the cross section D of the screw is the dimension of a single screw stroke.

The invention further provides a method of operating an injection molding machine for processing thermoplastics melts, having an injection unit and a casting mold, in which the injection unit comprises a screw movable in the tubular cylinder via guide means, which screw may be controlled with respect to its start and end/stop position in the tubular cylinder, characterized in that the screw is stopped at an end/stop position on ejection of the plastics melt, in that there remains in the tubular cylinder a residual volume, filled with melt, of more than $$\frac{\pi}{4} \cdot D^3$$

up to at most a melt volume comparable to the shot volume, wherein the cross section D of the screw is the dimension of a single screw stroke.

The invention relates in particular to a nozzle adapter which may be fitted in front of the cylinder head of the tubular cylinder and similarly prevents streaking on the surface of the molded article.

The adapter preferably has a volume of more than $$\frac{\pi}{4} \cdot D^3$$

up to at most a volume comparable to the shot volume.

The surprising effect of the device and method according to the invention may in principle be explained below as follows: the plastics melt is exposed to a high pressure during the injection process. The gas originating from the pellets and present in the melt then becomes dissolved in the melt. During the next injection process, this melt is injected into the mold (e.g. from the adapter). The gas remains in solution and does not reach the melt front as gas bubbles, the result being that no streaking occurs as is the case with the known methods. Even if the molding volume is greater than the volume of the adapter, no streaking occurs. This may possibly be explained by the pressure increase along the flow path. As mold filling progresses, the pressure in the space in front of the screw, and thus the melt pressure, increases. The higher the pressure, the greater the gas dissolution capacity. Since the melt from the adapter is injected into the mold first, the gas which has been entrained during the new metering process may dissolve before the melt reaches the mold.

The invention may in particular be realized with one of the following structural measures:

The cylinder head of an injection molding machine is provided with an enlarged space in front of the melt.

Between nozzle and cylinder head there is fitted an adapter component for producing an enlarged space in the front of the melt.

The machine nozzle and/or the hot runner of the injection mold is optionally additionally enlarged in order to produce the desired residual melt volume.

The tubular cylinder is in particular constructed to be correspondingly longer than the screw.

The screw stroke may be defined with the aid of a detachable mechanical limit stop. For cleaning purposes, this limit stop may be removed for short periods and refitted after cleaning of the buffer space.

The invention provides the following advantages over the known methods:

Use of a nozzle adapter results in higher process reliability. The volume from the nozzle adapter cannot be injected additionally into the mold, since the screw moves forward only up to a predetermined distance from the cylinder head. Operating errors are thereby avoided. By means of an interposed nozzle adapter, conventional injection-molding machines may be cost-effectively retrofitted without major effort.

Application of the method according to the invention optionally saves predrying of the thermoplastics material, which is processed on the injection molding machine.

Since all melt-processable materials tend to form streaks, the method may be used for all known thermoplastics.

The following thermoplastics may preferably be used: PC, ABS, PBT, SAN, PA, TPU, PET, PS, POM, polyolefins, in particular PP, together with mixtures thereof and mixtures with other plastics, e.g. mixtures of PC and ABS.

In order to reduce surface streaking, a residual buffer of melt corresponding to a volume of more than 1D screw stroke (cross-sectional area of the screw·length) may in principle be established via machine adjustment.

The usable shot volume in injection molding machines conventionally amounts to approximately 1 to 3 times the screw diameter (1D to 3D) multiplied by the cross section of the tubular cylinder.

Above a volume corresponding to a stroke, of more than 3D multiplied by the stroke length increased streaking on the moldings is observed in conventional machines.

The usable shot volume may be increased in streak-free manner when the device according to the invention is used up to a volume corresponding to at least 4D stroke of the screw.

This results in a considerable economic advantage, since smaller injection molding machines may be used to produce larger moldings.

Establishment of a residual buffer of melt by machine adjustment of the screw is not preferable, because, in the case of operating errors, the large residual buffer of melt may also be injected into the (casting mold) and machine and mold may thus be damaged.

The invention is explained in more detail below with reference to the Figures on the basis of an Example, which, however, does not limit the invention in any way.

IN THE FIGURES

EXAMPLE

Figure 1:
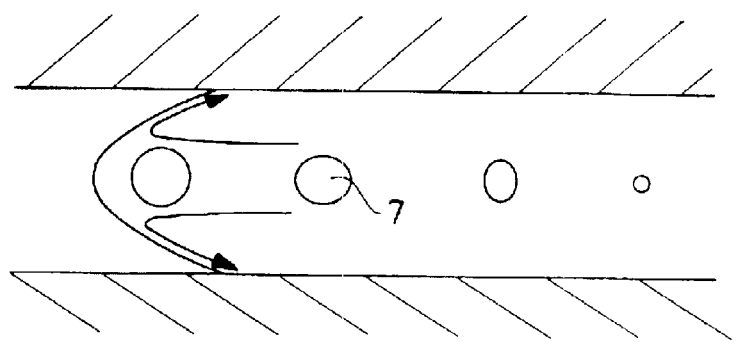
FIG. 1 shows a schematic cross section through a flow channel in an injection mold.

FIG. 1 shows a schematic cross section through a flow channel in an injection mold. It is thereby demonstrated that an increase in the volume of the gas bubbles 7 in the direction of the mold is inversely dependent on the pressure, a pressure gradient existing between the screw and the mold.

Figure 2:
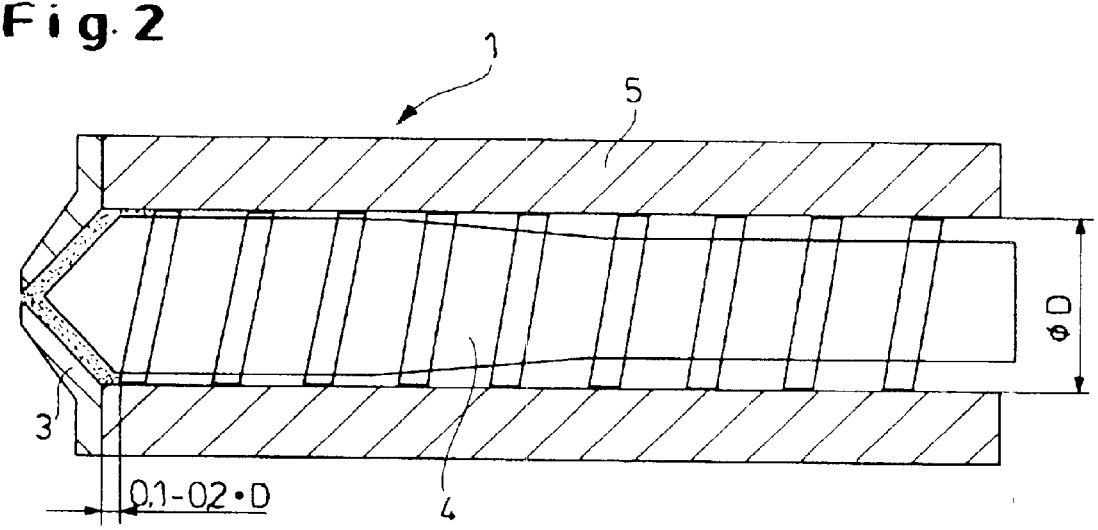
FIG. 2 shows a cross section through a conventional injection mold.

FIG. 2 shows a cross section through a conventional injection molding machine at the section that is presently relevant. This shows the normal, relatively small volume of the melt at the completion of the holding pressure and at that end of the tubular cylinder 5 upstream of the screw tip 2.

It may here be seen that, after metering and advance of the screw 4, only very little melt remains between the screw tip 2 and the cylinder head 3 of the tubular cylinder 5. According to the prior art, the residual buffer of melt typically amounts to 0.1 to 0.2 times the metering stroke times the tube cross section area. Since the usable metering stroke according to the prior art amounts at most to three times the screw diameter, a residual buffer of melt of at most $$(0.6 \cdot \underline{D}) \cdot \frac{\pi}{4} D^2$$

is obtained.

Figure 3:
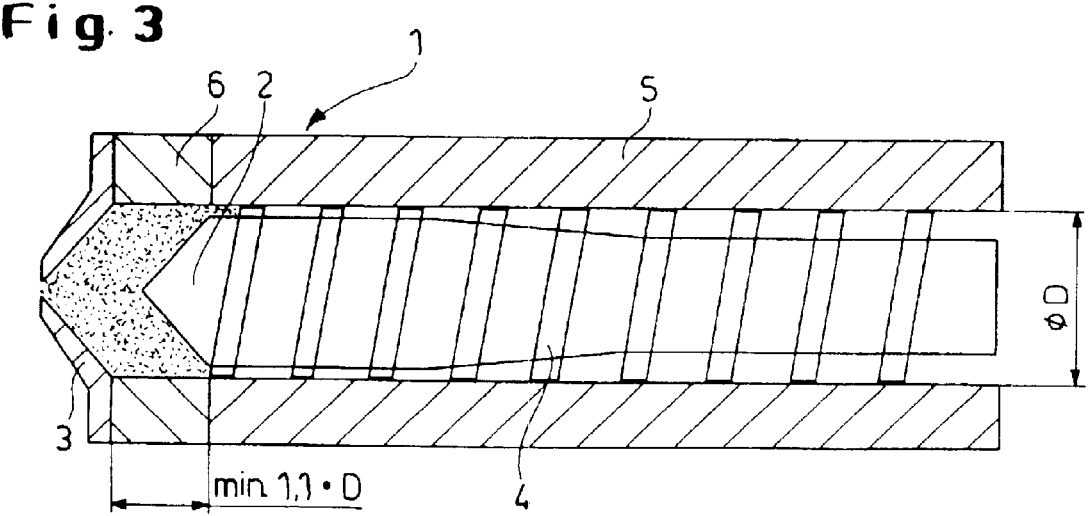
FIG. 3 shows a cross section through an injection mold modified according to the invention.

FIG. 3 shows a cross section through the relevant part of the modified injection molding machine where an adapter 6 is inserted. The insertion of the adapter yields a larger melt volume upstream of the screw tip after completion of the holding pressure phase. A comparison of the two Figures reveals that the melt buffer in FIG. 3 is substantially larger than in FIG. 2. The volume of the melt buffer amounts to $$1.1 \frac{\pi}{4} \cdot D^3$$

in the case of the injection mold 1 with adapter 6.

By means of the adapter, streak-free moldings of a variety of thermoplastics have been injection-molded in an injection mold as set out below.

Table 1 shows the results of various tests (1–5 comparative tests, A–E tests according to the invention).

| No | Material | Trade name Manufacturer Bayer AG | Molding | Charge | Proportion of rejects | Buffer volume |
|---|---|---|---|---|---|---|
| 1 | PC/ABS blend | Bayblend 1468 | End Cap | approx. 4 D | 96% | 23.8 cm$^3$ |
| A | PC/ABS blend | Bayblend 1468 | End Cap | approx. 4 D | 22.50% | 95.3 cm$^3$ |
| 2 | PC | Makrolon | End Cap | approx. | 30% | 23.8 |

-continued

| No | Material | Trade name Manufacturer Bayer AG | Molding | Charge | Proportion of rejects | Buffer volume |
|---|---|---|---|---|---|---|
| B | PC | Makrolon 2805 | End Cap | approx. 4 D | 0% | 95.3 cm³ |
| 3 | PC | Makrolon 2805 | Stacking box | approx. 2.7 D | approx. 50% | 15.9 cm³ |
| C | PC | Makrolon 2805 | Stacking box | approx. 2.7 D | <3.5% | 87.4 cm³ |
| 4 | PC/ABS blend | Bayblend 1468 | Stacking box | approx. 2.7 D | approx. 50% | 15.9 cm³ |
| D | PC/ABS blend | Bayblend 1468 | Stacking box | approx. 2.7 D | <3.5% | 87.4 cm³ |
| 5 | PC/ABS blend | Bayblend 1468 | Mains charger | approx. 3.3 D | 2.30% | 5.8 cm³ |
| E | PC/ABS blend | Bayblend 1468 | Mains charger | approx. 3.3 D | 0.90% | 34.6 cm³ |

Tests 1–2, A, B were performed on an injection molding machine made by Engel, type ES 700/150, with a screw diameter of 45 mm. A cap-shaped molding was produced. The metering stroke corresponded to approx. 4 times the screw diameter (c.f. Table, Charge)

In the first test, a PC/ABS blend was used. In the first part of the test, the buffer volume amounted to 23.8 cm³. The proportion of reject items was 96% and economic production would not have been possible. In the second part of the test, a buffer volume of approx. 95.3 cm³ was produced in front of the screw tip by means of an adapter. The reject proportion dropped to 22.5%, which represents a considerable improvement.

Polycarbonate (PC) resin was used in the second test. The procedure was again initially performed with a buffer volume of 23.8 cm³. The reject proportion was approx. 30%. With the above-mentioned buffer volume of 95.3 cm³, no more defective items were produced.

Tests 3 and C were carried out on the same machine to produce stacking boxes. The metering stroke corresponded this time to 2.7 times the screw diameter. In this test, the buffer volume was 87.4 cm³. With a buffer volume of 15.9 cm³, the proportion of silver streaks was 50% for test 3, and the proportion of moldings with silver streaks was approx. 3.5% with the above-mentioned buffer volume.

In the fourth test (4 and D) a PC/ABS blend was used and the reject proportion dropped to approx. 3.5% with a high buffer volume of approx. 50%.

Test 5 and E was performed on a machine made by Arburg, type 320-90-750, screw diameter 30 mm. The molding is a cover for mains chargers. With each cycle, 4 items were produced at the same time (four-cavity mold). The charge was 3.3 times the screw diameter. The buffer volume was approx. 34.6 cm³. Production with a buffer volume of 5.8 cm³ resulted in a reject proportion of approx. 2.3%, while with a high buffer volume the reject proportion was reduced to 0.9%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An injection molding machine having an injection unit and nozzle wherein the injection unit includes a tubular cylinder and a screw that is capable of back and forth movements along the tubular cylinder comprising means to stop the movement of the screw at its end/stop position at a distance from the nozzle thereby forming a gap between the screw and nozzle, the gap having a volume of more than $$\frac{\pi}{4} \cdot D^3$$

and up to the volume of a shot wherein the cross section D of the screw is the dimension of a single screw stroke.

2. An injection molding machine according to claim 1, wherein gap is formed by an adapter fitted between nozzle and screw head.

3. An injection molding machine according to claim 1 wherein the volume of the gap is formed by an enlarged volume of the machine nozzle and/or of the hot runner.

* * * * *